United States Patent
Kisu et al.

(10) Patent No.: US 11,370,370 B2
(45) Date of Patent: Jun. 28, 2022

(54) WIRING STRUCTURE OF WIRE HARNESS AND WIRE HARNESS

(71) Applicant: YAZAKI CORPORATION, Tokyo (JP)

(72) Inventors: Naomi Kisu, Susono (JP); Hisashi Takemoto, Susono (JP); Atsuyoshi Yamaguchi, Susono (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 17/222,038

(22) Filed: Apr. 5, 2021

(65) Prior Publication Data

US 2021/0309168 A1 Oct. 7, 2021

(30) Foreign Application Priority Data

Apr. 7, 2020 (JP) .............................. JP2020-069249

(51) Int. Cl.
*B60R 16/02* (2006.01)
*H02G 3/30* (2006.01)
*H01B 7/00* (2006.01)

(52) U.S. Cl.
CPC ......... *B60R 16/0215* (2013.01); *H02G 3/305* (2013.01); *H01B 7/0045* (2013.01)

(58) Field of Classification Search
CPC .... B60R 16/0215; B60R 16/02; H02G 3/305; H01B 7/0045; H01B 7/00; H01B 7/40; B65D 75/00
USPC ....................................................... 174/72 A
See application file for complete search history.

(56) References Cited

U.S. PATENT DOCUMENTS

| | | | |
|---|---|---|---|
| 2007/0107831 A1* | 5/2007 | Von Samson-Himmelstjerna ....... | B60R 16/0215 156/290 |
| 2015/0014052 A1* | 1/2015 | Matsuda .............. | H02G 3/0481 174/72 A |
| 2017/0327060 A1 | 11/2017 | Nakajima | |
| 2018/0015689 A1* | 1/2018 | Takata ................. | B60R 16/0215 |
| 2019/0287700 A1* | 9/2019 | Hamada ............... | H01B 7/0045 |
| 2020/0062198 A1 | 2/2020 | Mizushita et al. | |

FOREIGN PATENT DOCUMENTS

| | | |
|---|---|---|
| DE | 11 2018 002 441 T5 | 2/2020 |
| EP | 3 626 541 A1 | 3/2020 |
| JP | 2000-264137 A | 9/2000 |
| JP | 2004-306741 A | 11/2004 |

(Continued)

*Primary Examiner* — Timothy J Thompson
*Assistant Examiner* — Michael F McAllister
(74) *Attorney, Agent, or Firm* — Sughrue Mion, PLLC

(57) ABSTRACT

A wiring structure of a wire harness in which the wire harness is wired by being fixed to an adhesive member laid on a surface of a roof lining of an automobile is provided. At least a part of a plurality of electric wires constituting the wire harness in a length direction are sandwiched between two belt-shaped tapes in which both side edges in the width direction are fixed to each other, are arranged side by side in the width direction of the tapes, and are attached to an adhesive surface provided on an inner surface of at least one of the two tapes, thereby holding the bundle of the electric wires in a flat shape, and an outer surface of one of the two tapes is attached to the adhesive member, whereby the wire harness is fixed to the surface of the roof lining.

4 Claims, 4 Drawing Sheets

(56) References Cited

FOREIGN PATENT DOCUMENTS

| JP | 2014-136536 A | 7/2014 |
| JP | 2016-139551 A | 8/2016 |

* cited by examiner

WIRING STRUCTURE OF WIRE HARNESS AND WIRE HARNESS

CROSS REFERENCE TO RELATED APPLICATIONS

This application is based on and claims priority from Japanese patent application No. 2020-069249 filed on Apr. 7, 2020, the entire contents of which are incorporated herein by reference.

TECHNICAL FIELD

The present invention relates to a wiring structure of a wire harness in an automobile roof portion and a wire harness for an automobile roof portion.

BACKGROUND ART

A roof portion of an automobile is provided with a roof panel constituting an upper surface of a roof portion and a roof lining mounted on the roof panel and constituting a lower surface of the roof portion. A wire harness is wired in a space between the roof panel and the roof lining, and electric power is supplied to a room lamp or the like via the wire harness.

Incidentally, for example, as in Patent Literature 1, a wire harness wired in a roof portion of an automobile is fixed in a desired wiring path by being pressed and adhered and fixed to an adhesive member laid along a wiring path in advance on the surface of a roof lining. However, since the wire harness for the automobile roof portion has a circular cross section or may not have an uniform cross section, the wire harness cannot be adhered and fixed in a wide adhesion area, and it is difficult to securely fix the wire harness. Further, as in Patent Literature 2, when only the predetermined position of the wire harness is fixed with the adhesive tape, the area of the adhesive tape fixed to the ceiling material is limited, and thus it is necessary to fix the adhesive tape to the ceiling material by using the welding gun.

Therefore, Patent Literature 3 describes a wiring structure of a wire harness of an automobile roof portion capable of increasing the fixing strength. In this wiring structure, the plurality of electric wires constituting the wire harness are in an unbound state, and the electric wires in the unbound state are surrounded by a tubular body formed of a flexible sheet with a gap therebetween, and the tubular body is fixed to the adhesive member on the surface of the roof lining in a flat cross-sectional shape.

That is, in this wiring structure, the plurality of electric wires can be moved by using the gap in the tubular body, and when the wire harness is fixed on the adhesive member of the roof lining, the tubular body is smashed from above and below and fixed to the adhesive member while being deformed into a flat cross-sectional shape. As a result, the wire harness can be firmly and stably fixed on the adhesive member of the roof lining while securing a large adhesion area of the tubular body without requiring any separate component or a complicated work process.

CITATION LIST

Patent Literature

Patent Literature 1: JP-A-2000-264137
Patent Literature 2: JP-A-2004-306741
Patent Literature 3: JP-A-2014-136536

SUMMARY OF INVENTION

In the technique described in Patent Literature 3, although the electric wire in the flexible sheet is not fixed and freely movable, the electric wire is bound at the branch portion. Therefore, in practice, there is a case where a portion that is less likely to spread side by side in a flat shape in the flexible sheet may be generated, and in such a portion, a sufficient adhesion area may not be secured, and the fixing force may decrease. In addition, in a state after the wire harness is wired and fixed to the roof lining, the electric wire may move in the flexible sheet and may be affected by the vehicle vibration.

The present invention has been made in view of the above-described circumstances, and an object of the present invention is to provide a wiring structure of a wire harness in an automobile roof portion in which a flat form can be reliably maintained by restraining useless movement of the electric wires, and a strong fixing strength to the roof lining can be stably exhibited and a wire harness for an automobile roof portion used in the wiring structure.

According to an embodiment of a wiring structure of a wire harness in which a wire harness is wired by being fixed to an adhesive member laid on a surface of a roof lining of an automobile, at least a part of a plurality of electric wires constituting the wire harness in a length direction are sandwiched between two belt-shaped tapes in which both side edges in the width direction are fixed to each other, are arranged side by side in the width direction of the tapes, and are attached to an adhesive surface provided on an inner surface of at least one of the two tapes, thereby holding the bundle of the electric wires in a flat shape, and an outer surface of one of the two tapes is attached to the adhesive member, whereby the wire harness is fixed to the surface of the roof lining.

DESCRIPTION OF EMBODIMENTS

Specific embodiments according to the present invention will be described below with reference to the accompanying drawings.

Figure 1:
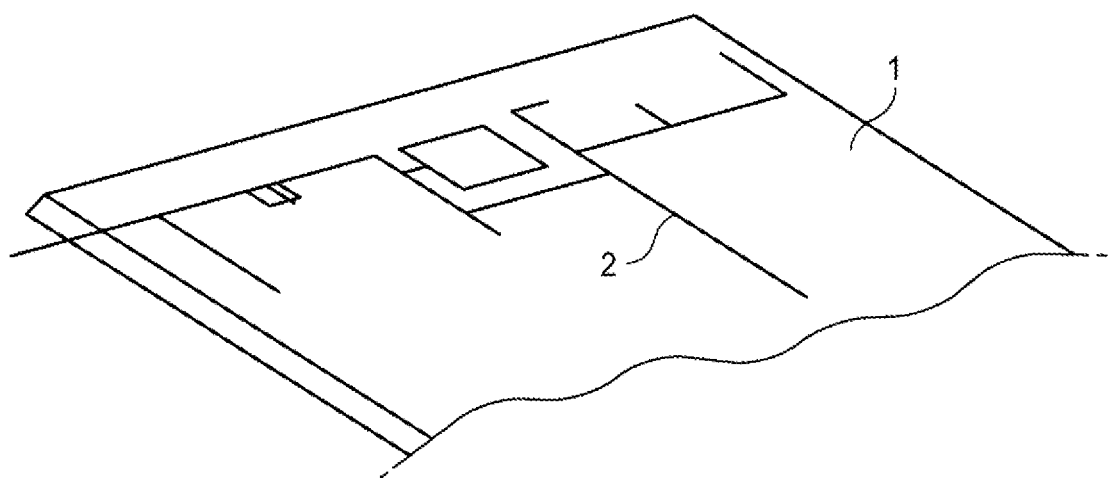
FIG. 1 is a perspective view showing a state of an upper surface of a roof lining before a wire harness for an automobile roof portion according to an embodiment of the present invention is fixed to a roof lining.
Figure 2:
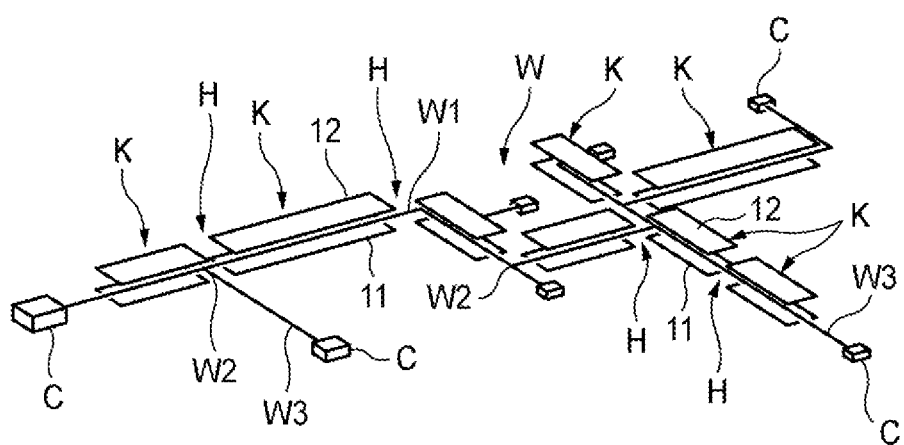
FIG. 2 is a perspective view showing a state in which tapes which sandwich an electric wire are disposed at predetermined positions of the wire harness according to the prevent invention.
Figure 3:
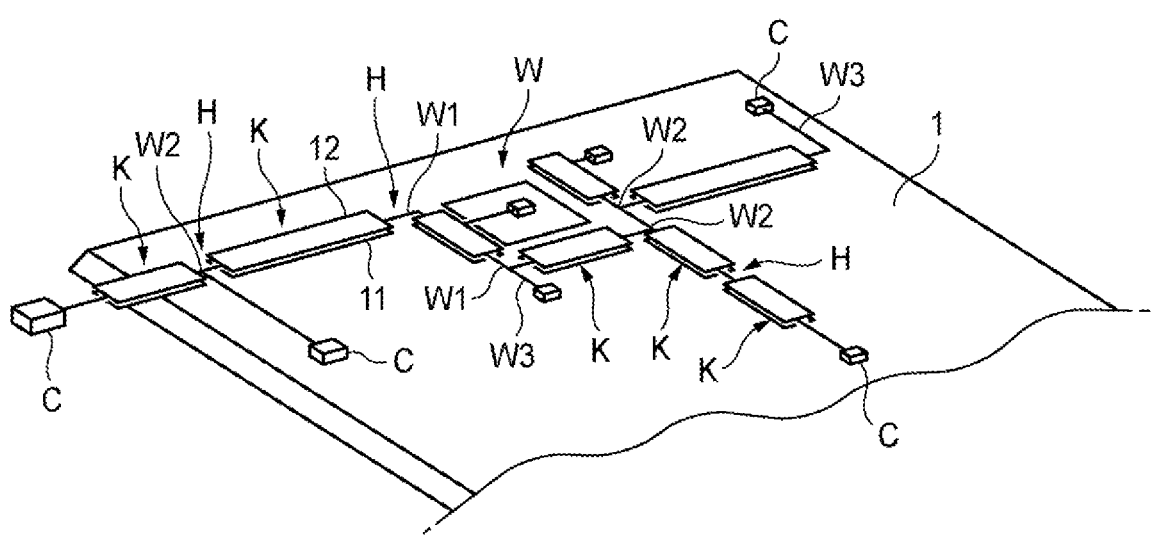
FIG. 3 is a perspective view showing a wiring structure of the wire harness in the automobile roof portion according to the embodiment of the present invention.
Figure 4:
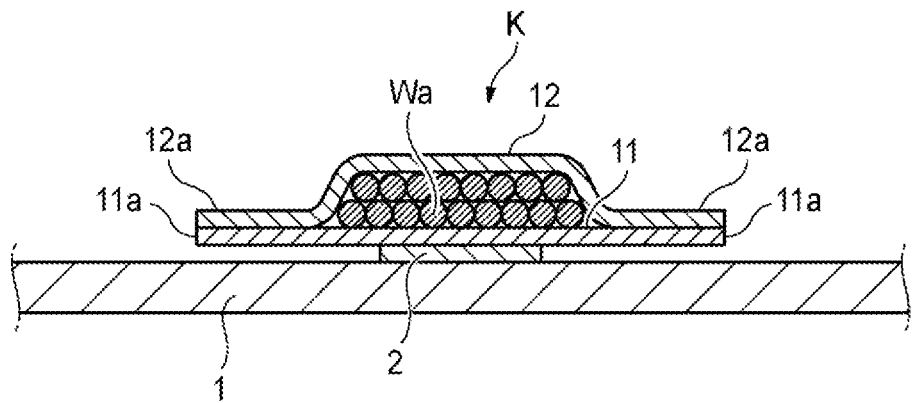
FIG. 4 is an enlarged cross-sectional view of restraint portions by the tapes of FIG. 3.

FIG. 1 is a perspective view showing a state of an upper surface of a roof lining before a wire harness for an automobile roof portion according to an embodiment of the present invention is fixed to a roof lining, FIG. 2 is a perspective view showing a state in which tapes which sandwich an electric wire are disposed at predetermined positions of the wire harness, FIG. 3 is a perspective view showing a wiring structure of the wire harness in the automobile roof portion according to the embodiment of the present invention, and FIG. 4 is an enlarged cross-sectional view of restraint portions by the tapes of FIG. 3.

As shown in FIG. 4, a wire harness W for an automobile roof portion of the present embodiment is fixed to and wired on an adhesive member (double-sided adhesive tape 2) laid on a surface of a roof lining 1 of an automobile. Therefore, as shown in FIG. 1, on the surface of the roof lining 1, the double-sided adhesive tape 2 which is an adhesive member is laid along a predetermined wiring path in advance before wiring of the wire harness W.

As shown in FIGS. 2 and 3, since the plurality of electric wires having a connector C attached to terminal portions are wired along a predetermined path, the wire harness includes a trunk line portion W1 and a branch line portion W3 branched from the trunk line portion W1 via a branch portion W2. In the wire harness W, restraint portions K in which the bundle of the electric wires is restrained in a flat shape by being sandwiched between two upper and lower tapes 11, 12 are provided at predetermined positions in the length direction of a trunk line portion W1 excluding the branch line portion W3, and non-restraint portions H in which the bundle of the electric wires is not restrained are provided between the adjacent restraint portions K.

As shown in FIG. 4, as the example of the cross section thereof, the restraint portion K sandwiches the plurality of electric wires Wa between two tapes 11, 12 in which both side edges 11a, 12a in the width direction are fixed to each other. The plurality of electric wires Wa are spread side by side in the width direction of the tapes 11, 12, and are attached to an adhesive surface (reference numeral omitted) provided on the inner surface of at least one of the two tapes 11, 12, so that the restraint portion is a portion in which the bundle of the electric wires Wa is held in a flat shape.

In the illustrated example, an adhesive surface is provided over the entire inner surfaces of the two tapes 11, 12, and among the electric wires Wa disposed side by side in the upper and lower two stages, the electric wire Wa in the lower row is fixed to the adhesive surface of the tape 11 on the lower side, and the electric wire Wa in the upper row is fixed to the adhesive surface of the tape 12 on the upper side. In addition, the adhesive surfaces of both side edges 11a, 12a of the two tapes 11, 12 in the width direction are fixed to each other, whereby the cross section of the restraint portion K is formed into a flat shape.

The wire harness W having such a configuration is disposed on the upper surface of the roof lining 1 as shown in FIG. 3, and the outer surface (lower surface) of the tape 11 on the lower side of the restraint portion K is pressed against and attached to the double-sided adhesive tape 2 laid on the surface of the roof lining 1 in advance, whereby the wire harness W is fixed to the surface of the roof lining 1. As a result, the wiring structure of the wire harness of the automobile roof portion shown in FIG. 3 is formed.

According to the wiring structure of the wire harness of the automobile roof portion and the wire harness for the automobile roof portion described above, in the restraint portion K, the plurality of electric wires Wa are sandwiched between the two tapes 11, 12, and the electric wires Wa are attached to the adhesive surfaces provided on the inner surfaces of the tapes 11, 12 in a state where the electric wires Wa are arranged side by side. Therefore, the movement of each electric wire Wa can be restrained by the adhesive force of the adhesive surface, and the bundle of the electric wires Wa in the portion can be reliably maintained in a flat shape.

Therefore, the wire harness W can be easily attached to the double-sided adhesive tape 2 of the roof lining 1 with a wide adhesive area in the flat shape, and the fixing strength can be increased while enhancing the wiring workability. In addition, since the electric wire Wa is restrained so as not to move uselessly, the electric wire is less likely to be affected by the vehicle vibration. In addition, since only the electric wire Wa is sandwiched between the two tapes 11, 12, so that it can be realize with a simple configuration without the need for other binding members.

In addition, since the portion of the two tapes 11, 12 sandwiching the electric wires Wa is maintained in a flat cross-sectional shape, in particular, when a hard tape is used, the linearity of the portion held by the tapes 11, 12 can be maintained, and the ease of wiring to the roof lining 1 of a wide plane and the compact wiring performance in a narrow space can be secured.

In addition, since the trunk line portion W1 excluding the branch line portion W3 is only restrained in a flat shape with the tapes 11, 12, the flexibility in a range from the branch portion W2 to the branch line portion W3 can be provided.

Further, since the restraint portions K by the tapes 11, 12 are provided at intervals in the length direction of the trunk line portion W1 and the non-restraint portions H in which the tapes 11, 12 are not disposed are provided between the adjacent restraint portions K, the wire harness W can be freely bent in the positions of the non-restraint portions H although the linearity of the wire harness W is maintained in the restraint portions K. Therefore, it is easy to fold and store during transportation or the like, and handleability is improved. When unfolded, the branch line portion W3 is less likely to be entangled as in the case of being rolled and stored.

In addition, since a portion (non-restraint portion H) which is not restrained by the tapes 11, 12 is provided in each of the trunk line portions W1, even when some misalignment or the like occurs during wiring, the misalignment or the like can be absorbed and adjusted and the wiring workability can be improved by utilizing the flexibility of the portion.

Further, since the trunk line portion W1 can be easily restrained in a form of being sandwiched by the tapes 11, 12, convergence of the branch portion W2 is not necessarily performed by extending the restraint portion K to the vicinity of the branch portion W2. Therefore, it is possible to reduce the trouble of the convergence work using another vinyl tape or the like with respect to the branch portion W2.

In the above embodiment, the case where the separate objects are used as the two upper and lower tapes 11, 12 is shown, but one wide tape may be bent at the center in the width direction and used as a tape for combining two tapes.

Further, when the tapes 11, 12 are made transparent or translucent, since the double-sided adhesive tape 2 which is an attachment target part can be seen through, it is possible to attach accurately while visually checking the attachment target part, which can contribute to the improvement of the wiring quality. In addition, when the colors of the tapes 11, 12 are made lighter than the color of the attachment target part, it is also possible to visually confirm the attachment target part.

In addition, a colored tape can be adopted for the tapes 11, 12 to perform identification of the individuals, distinction between the left and right, or the like by the color of the tape. In such a case, it is not necessary to separately attach a colored tape for identification.

In addition, since the electric wire Wa is sandwiched between the tapes 11, 12, the protection function for the electric wire Wa can be easily adjusted by increasing or decreasing the thickness of the tapes 11, 12.

In the above embodiment, although the case where the adhesive surface is provided on both inner surfaces of the two tapes 11, 12, the adhesive surface may be provided only on the inner surface of one of the tapes. In this case, it is desirable that all the electric wires Wa arranged in one row are attached to the adhesive surface to maintain the flat shape, but as in the example of FIG. 4, in the case where the electric wires Wa are arranged side by side in upper and lower two stages, a corresponding effect can be expected if only the electric wires Wa in the upper row or the lower row are attached to the adhesive surface.

In addition, the adhesive surface is not necessarily provided on the entire inner surfaces of the tapes 11, 12, and may be provided at least only in the arrangement region of the electric wires Wa in the center in the width direction. The side edge portions of the tapes 11, 12 may be fixed to each other by using an adhesive surface provided on the inner surface, using a separately prepared double-sided adhesive tape, or by any other coupling means. When the adhesive surface or the adhesive is used, if the adhesive surface and the adhesive are not exposed due to misalignment or the like when the tapes 11, 12 are bonded to each other, the bonding workability and the quality is improved.

In addition, if the lengths, widths, colors, or the like of the tapes 11, 12 are different according to the position of the restraint portion K and correspond to the wiring position, the wiring of the wire harness W can be advanced with reference to them.

According to an embodiment of a wiring structure of a wire harness in which the wire harness (W) is wired by being fixed to an adhesive member (2) laid on a surface of a roof lining (1) of an automobile, at least a part of a plurality of electric wires (Wa) constituting the wire harness (W) in a length direction are sandwiched between two belt-shaped tapes (11, 12) in which both side edges (11*a*, 12*a*) in the width direction are fixed to each other, are arranged side by side in the width direction of the tapes (11, 12), and are attached to an adhesive surface provided on an inner surface of at least one of the two tapes (11, 12), thereby holding the bundle of the electric wires in a flat shape, and an outer surface of one of the two tapes (11, 12) is attached to the adhesive member, whereby the wire harness (W) is fixed to the surface of the roof lining (1).

According to the wiring structure of the wire harness having the configuration of the above, the plurality of electric wires sandwiched between the two tapes are attached to the adhesive surfaces provided on the inner surfaces of the tapes in a state being spread side by side. Therefore, the movement of each electric wire can be restrained by the adhesive force of the adhesive surface, the bundle of electric wires in the portion can be reliably maintained in a flat shape. Therefore, the wire harness can be easily attached to the adhesive member of the roof lining with a wide adhesive area in the flat shape, and the fixing strength can be increased while enhancing the wiring workability. In addition, since the electric wire is restrained so as not to move uselessly, the electric wire is less likely to be affected by the vehicle vibration. In addition, since only the electric wire is sandwiched between the tapes, so that it can be realize with a simple configuration without the need for other binding members. In addition, since the portion of the two tapes sandwiching the electric wire is maintained in a flat cross-sectional shape, in particular, when a hard tape is used, the linearity of the portion held by the tape can be maintained, and the ease of wiring to the roof lining of a wide plane and the compact wiring performance in a narrow space can be secured.

In the wiring structure of a wire harness, restraint portions (K) in which the bundle of the electric wires (Wa) is restrained in a flat shape by being sandwiched between the tapes (11, 12) may be provided in the length direction of a trunk line portion (W1) excluding the branch line portion (W3) of the wire harness (W), and non-restraint portions (H) in which the bundle of the electric wires (Wa) is not restrained may be provided between the adjacent restraining portions (K).

According to the wiring structure of the wire harness having the configuration of the above, since the trunk line portion excluding the branch line portion is only restrained to the flat shape with the tape, the flexibility in a range from the branch portion to the branch line portion can be provided. Further, since the restraint portions by the tapes are provided at intervals in the length direction of the trunk line portion and the non-restraint portions are provided between the adjacent restraint portions, the wire harness can be freely bent in the non-restraint portions although the linearity of the wire harness is maintained in the restraint portions. Therefore, it is easy to fold and store during transportation or the like, and handleability is improved. When unfolded, the branch line portion is less likely to be entangled as in the case of being rolled and stored. In addition, since a portion (non-restraint portion) which is not restrained by the tapes is provided in each of the trunk line portions, even when some misalignment or the like occurs during wiring, the misalignment or the like can be absorbed and adjusted and the wiring workability can be improved by utilizing the flexibility of the portion. In addition, since the trunk line portion can be easily restrained in a form of being sandwiched by the tapes, convergence of the branch portion is not necessarily performed by extending the restraint portion by the tapes to the vicinity of the branch portion from the trunk line portion to the branch line portion. Therefore, it is possible to reduce the trouble of the convergence work using another vinyl tape or the like with respect to the branch portion.

According to an embodiment of a wire harness (W) that is fixed and wired to an adhesive member (2) laid on a surface of a roof lining (1) of an automobile, at least a part of a plurality of electric wires (Wa) in a length direction are sandwiched between two tapes (11, 12) in which both side edges (11*a*, 12*a*) in the width direction are fixed to each other, are arranged side by side in the width direction of the tapes (11, 12), and are attached to an adhesive surface provided on an inner surface of at least one of the two tapes (11, 12), thereby holding the bundle of the electric wires (Wa) in a flat shape.

According to the wire harness having the configuration of the above, the plurality of electric wires sandwiched between the two tapes are attached to the adhesive surfaces provided on the inner surfaces of the tapes in a state being spread side by side. Therefore, the movement of each electric wire can be restrained by the adhesive force of the adhesive surface, the bundle of electric wires in the portion can be reliably maintained in a flat shape. Therefore, the wire harness can be easily attached to the adhesive member of the roof lining with a wide adhesive area in the flat shape, and the fixing strength can be increased while enhancing the wiring workability. In addition, since the electric wire is restrained so as not to move uselessly, the electric wire is less likely to be affected by the vehicle vibration. In addition, since only the electric wire is sandwiched between the tapes, so that it can be realize with a simple configuration without the need for other binding members. In addition, since the portion of the two tapes sandwiching the electric wire is maintained in a flat cross-sectional shape, in particular, when a hard tape is used, the linearity of the portion held by the tape can be maintained, and the ease of wiring to the roof lining of a wide plane and the compact wiring performance in a narrow space can be secured.

In the wire harness (W), restraint portions (K) in which the bundle of the electric wires (Wa) is restrained in a flat shape by being sandwiched between the tapes (11, 12) may be provided in the length direction of a trunk line portion (W1) excluding the branch line portion (W3) of the wire harness (W), and non-restraint portions (H) in which the bundle of the electric wires is not restrained may be provided between the adjacent restraining portions (K).

According to the wire harness having the configuration of the above, since the trunk line portion excluding the branch line portion is only restrained to the flat shape with the tape, the flexibility in a range from the branch portion to the branch line portion can be provided. Further, since the restraint portions by the tapes are provided at intervals in the length direction of the trunk line portion and the non-restraint portions are provided between the adjacent restraint portions, the wire harness can be freely bent in the non-restraint portions although the linearity of the wire harness is maintained in the restraint portions. Therefore, it is easy to fold and store during transportation or the like, and handleability is improved. When unfolded, the branch line portion is less likely to be entangled as in the case of being rolled and stored. In addition, since a portion (non-restraint portion) which is not restrained by the tapes is provided in each of the trunk line portions, even when some misalignment or the like occurs during wiring, the misalignment or the like can be absorbed and adjusted and the wiring workability can be improved by utilizing the flexibility of the portion. In addition, since the trunk line portion can be easily restrained in a form of being sandwiched by the tapes, convergence of the branch portion is not necessarily performed by extending the restraint portion by the tapes to the vicinity of the branch portion from the trunk line portion to the branch line portion. Therefore, it is possible to reduce the trouble of the convergence work using another vinyl tape or the like with respect to the branch portion.

According to an embodiment, a flat form can be reliably maintain by restraining useless movement of the electric wires, and a strong fixing strength to the roof lining can be stably exhibited.

What is claimed is:

1. A wiring structure of a wire harness in which a wire harness is wired by being fixed to an adhesive member laid on a surface of a roof lining of an automobile, wherein
    at least a part of a plurality of electric wires constituting the wire harness in a length direction are sandwiched between two belt-shaped tapes in which both side edges in the width direction are fixed to each other, are arranged side by side in the width direction of the tapes, and are attached to an adhesive surface provided on an inner surface of at least one of the two tapes, thereby holding the bundle of the electric wires in a flat shape, and
    an outer surface of one of the two tapes is attached to the adhesive member, whereby the wire harness is fixed to the surface of the roof lining.

2. The wiring structure of a wire harness according to claim 1, in which restraint portions in which the bundle of the electric wires is restrained in a flat shape by being sandwiched between the tapes are provided in the length direction of a trunk line portion excluding the branch line portion of the wire harness, and non-restraint portions in which the bundle of the electric wires is not restrained are provided between the adjacent restraining portions.

3. A wire harness that is fixed and wired to an adhesive member laid on a surface of a roof lining of an automobile, wherein
    at least a part of a plurality of electric wires in a length direction are sandwiched between two tapes in which both side edges in the width direction are fixed to each other, are arranged side by side in the width direction of the tapes, and are attached to an adhesive surface provided on an inner surface of at least one of the two tapes, thereby holding the bundle of the electric wires in a flat shape.

4. The wire harness according to claim 3, in which restraint portions in which the bundle of the electric wires is restrained in a flat shape by being sandwiched between the tapes are provided in the length direction of a trunk line portion excluding the branch line portion of the wire harness, and non-restraint portions in which the bundle of the electric wires is not restrained are provided between the adjacent restraining portions.

* * * * *